Sept. 9, 1969 A. E. BLOOD ET AL 3,466,149

TOWER REACTOR

Filed Feb. 25, 1966 2 Sheets-Sheet 1

ALDEN E. BLOOD
HERSCHEL T. VINYARD
GLENN L. PHILLIPS
INVENTORS

BY
ATTORNEY & AGENT

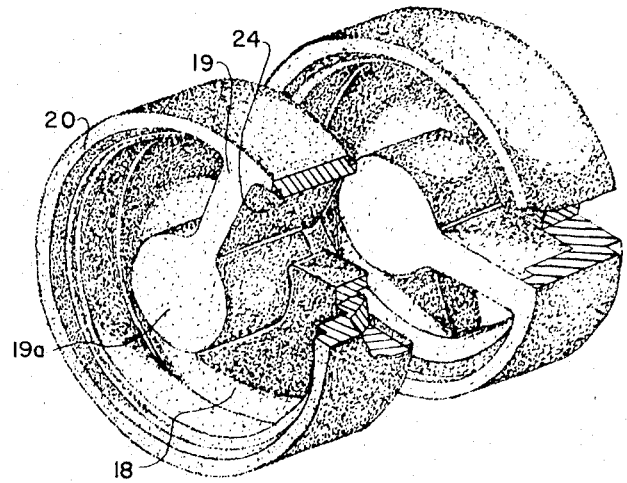
FIG. 3
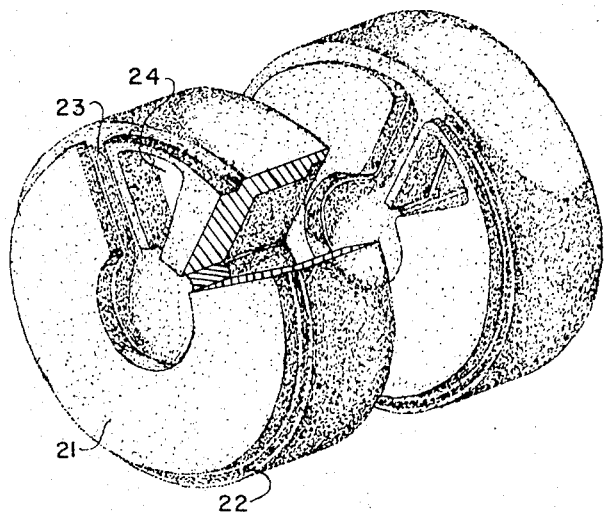
FIG. 4
ALDEN E. BLOOD
HERSCHEL T. VINYARD
GLENN L. PHILLIPS
INVENTOR.
BY 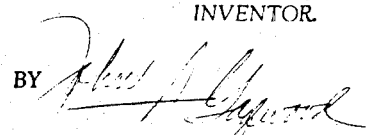
ATTORNEY

United States Patent Office 3,466,149
Patented Sept. 9, 1969

3,466,149
TOWER REACTOR
Alden E. Blood, Herschel T. Vinyard, and Glenn L. Phillips, Longview, Tex., assignors to Eastman Kodak Company, Rochester, N.Y., a corporation of New Jersey
Filed Feb. 25, 1966, Ser. No. 530,127
Int. Cl. C01b *17/86, 31/30*
U.S. Cl. 23—283                                    9 Claims

ABSTRACT OF THE DISCLOSURE

Tower reactors particularly for reactions at elevated temperatures to obtain high linear velocity and heat transfer. The reactors include a shell containing a plurality of stacked members or plates having a design to conform to the reactor shell, each member having a sector of an annular depression formed therein, an aperture adjacent to one end of the sector, and angularly displaced male and female parts for cooperating with corresponding parts on an adjacent member when in the stacked relation to angularly displace the aperture in an adjacent member. The reactors are particularly useful in oxidative dehydrogenation processes for the production of unsaturated organic compounds.

---

Figure 1:
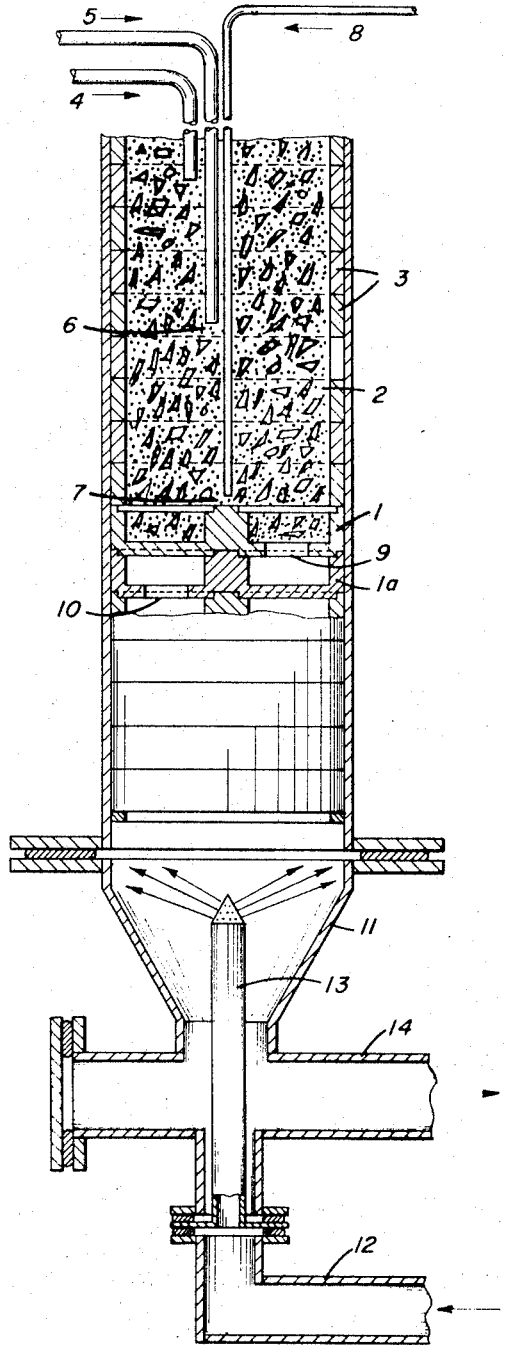

This invention relates to tower reactors particularly adapted to carrying out reactions at elevated temperatures so as to obtain high linear velocity and heat transfer. The reactors are particularly designed for use in oxidative dehydrogenation processes for the production of unsaturated organic compounds.

In oxidative dehydrogenation processes of the type utilizing a reaction mixture including an organic compound, oxygen and iodine species, the reactants are introduced into tower reactor which is heated by suitable means. The tower may be packed with inert material such as silica in the form of chips or Rashig rings. In the dehydrogenation process described in the Blood et al. U.S. patent application, Ser. No. 388,196 filed Aug. 7, 1964, the organic compound, hydrogen iodide hydrate and air are introduced into a tower reactor preferably so as to preheat the organic compound and hydrogen iodide hydrate separately before mixing with air in the reaction zone. For example, in the synthesis of methyl methacrylate from methyl isobutyrate, the methyl isobutyrate and hydrogen iodide hydrate should be preheated to about 350 to 450° C. in the upper zone of the reactor before mixing with the air and then mixed with air in the reaction zone at a temperature of about 450 to 650° C.

In the mentioned oxidative dehydrogenation processes using random packing in the reactor, appreciable carbonization takes place resulting in poor heat transfer and eventual plugging of the reactor.

We have discovered that by providing the reactor with plates of the design described below a considerable increase in linear velocity and heat transfer is obtained and carbonization is substantially eliminated.

The tower reactors of the invention include a shell ordinarily circular, which may be steel or ceramic-lined steel, a plurality of stacked members or plates essentially circular in shape to conform to the shell of the reactor, and having a sector of an annular depression formed therein, an aperture preferably adjacent to one end of the sector, and angularly displaced male and female parts for cooperating with corresponding parts on an adjacent member when in the stacked relation to angularly displace the aperture relative to the aperture in an adjacent member. Thus a media introduced into the depression in any one of said members flows in an arcuate path from the aperture in one member to the aperture in an adjacent and lower member and in a continuous or discontinuous, helical or spiral path down through the lower tower members. The members may be made of siliceous material such as silica, Carborundum (containing silicon carbide) and preferably of silicon carbide, especially when the tower reactor is employed in the mentioned oxidative dehydrogenation processes.

The accompanying drawings show views of tower reactors containing the stacked circular members particularly as adapted to use in the mentioned dehydrogenation processes. Included in the invention and shown in the drawings, positioned at the exit of the tower reactor is a quench chamber adapted to rapidly quench hot effluent with chilled media, particularly so as not to subject the lower-most circular plate member to the action of the quench media.

FIG. 1 shows a reactor tower suitably heated, only the lower part of which contains a stack of seven of the circular plate members such as plates 1 and 1a, the upper part of the tower being packed with pieces of inert material such as siliceous material, especially silicon carbide chips. Sleeves of siliceous material 3 such as silicon carbide should separate the packing from the walls of the steel shell, particularly to reduce carbonization. In the oxidative dehydrogenation processes the sleeves are not required in the lower part of the reactor due to the presence of the plate members. When the shell of the reactor is steel or similar material, it should be lined with passive material including siliceous substances such as silica, glass, etc. at least in the upper zone of the reactor which contains the random ceramic packing in order to reduce carbonization at the walls of the shell. Organic material and catalyst such as hydrogen iodide hydrate enter the reactor through lines 4 and 5 respectively and mix at zone 6 and the mixture may then combine at zone 7 with a feed coming from line 8, which is oxygen in the case of the oxidative dehydrogenation processes mentioned. The resultant mixture then flows through aperture 9 of plate 1 in an arcuate path through the underlying member 1a and out of its angularly displaced aperture 10 and similarly in a spiral or helical path down through the underlying plate members which would appear in cross section substantially as shown for plates 1 and 1a, thereby giving increased linear velocity and heat transfer over that obtainable by the use of random packing in the zone above the plates. In the drawing, for convenience, apertures 9 and 10 are shown displaced about 180° from each other. Ordinarily, the displacement is about 60–80° to obtain maximum linear velocity through the annular depressions of the plate members. The hot reaction mixture emerges from the aperture of the lowermost plate into the quench chamber 11 where it is rapidly quenched by chilled media entering the chamber through line 12 and nozzle 13, the chamber and nozzle being so designed and operated in conjunction with the stream of hot effluent from the reactor that the effluent is rapidly quenched by the chilled spray directed substantially only to the walls of the chamber and not against the lower surface of the plate member above. The quenched effluent passes out of the quench area through line 14. For use in the mentioned oxidative dehydrogenation processes employing hydrogen iodide hydrate, the quench chamber and nozzle should be constructed of titanium, zirconium or titanium-palladium alloy (about 0.1% palladium) or other titanium alloy resistant to corrosion by hydrogen iodide. In this system utilizing hydrogen iodide hydrate it had been expected that the mentioned metals would corrode badly in the presence of hydrogen iodide. That is, published corrosion data give a corrosion rate for titanium metal of 6.0 mils per year in hydroiodic acid, and in iodine alcohol the metal is pitted at a rate of about 200 mils per year. We have found a value of 200 mils per year with iodine in methyl isobutyrate and the titanium was also pitted. However, in the process involving the oxidative dehydrogenation of organic compounds with hydrogen iodide hydrate even in the presence of iodine substantially no corrosion of the mentioned metals takes place. It was found that small amounts of hydrogen iodide even in the presence of iodine serve to prevent corrosion of the mentioned metals.

Figure 2:
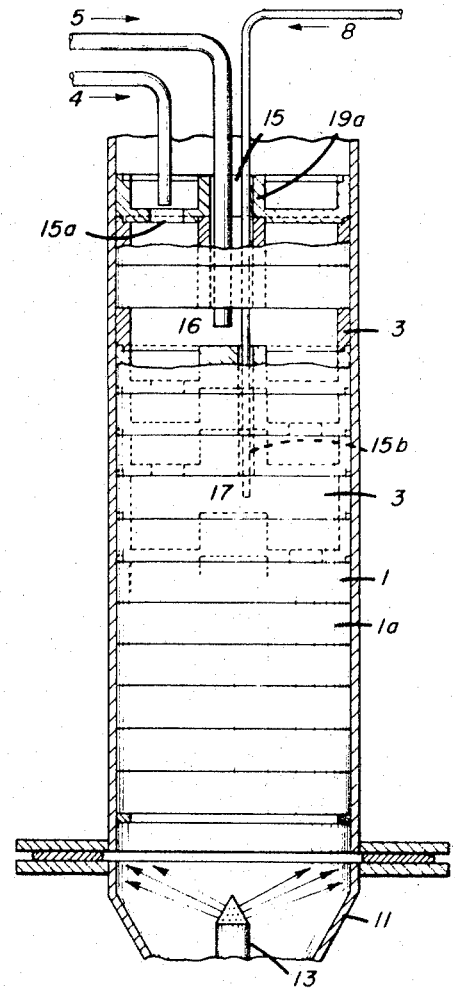

FIG. 2 shows a tower reactor having a steel shell packed the entire length with the circular plate members which, in the stack above plate 1, in addition to being provided with the angularly displaced apertures, are each provided with a central aperture 15 whereby the feed from line 4 is passed into the reactor through aperture 15a whence it travels in an arcuate path in the underlying plates to zone 16 of the central aperture where the feed mixes with the feed entering the reactor through line 5. This mixing of the two feeds can be accomplished by providing a fluid communication at 16 between the angularly displaced aperture and the central aperture; for example, by merely replacing the plate member at zone 16 by a ceramic sleeve 3 such as shown in FIG. 1. Otherwise in the plate at zone 16 the entire central part or hub of the plate formed by the depression can be removed to provide a mixing chamber. The mixed feed from lines 4 and 5 then passes from zone 16 in an arcuate path through the annular depressions and angularly displaced apertures of the underlying plates to zone 17 where the mixed feed can be combined, as at zone 16, with the feed from line 8. The combined feed then passes through the depressions and angularly displaced apertures of the underlying plates in an arcuate path down through the reactor to be quenched in chamber 11 as described above. Using a tower of the design shown in FIG. 2 it was possible to obtain a contact time of about 4.5 seconds compared to 2 seconds for the tower packed as in FIG. 1. Linear velocity increased from about 6 feet per second to about 60 feet per second. The shell in the FIG. 2 reactor may be lined with siliceous material such as glass but ordinarily this is not necessary since the plate members prevent the reactants from reaching the walls of the reactor. Instead of separate feed lines 5 and 8, concentric or eccentric tubes described in more detail below are preferably used to conduct the feed of lines 5 and 8 to zones 16 and 17 respectively.

The tower reactor of FIG. 2 may be described as containing a plurality of stacked circular members each having a sector of an annular depression formed therein, an aperture 15a adjacent one end of said sector, and angularly displaced male and female parts for cooperating with corresponding parts of an adjacent member when in the stacked relation, to angularly displace the aperture relative to the aperture in an adjacent member; whereby a first media introduced through line 4 into the depression in one of said members flows in an arcuate path from the aperture in one member to the aperture in an adjacent and lower member. In the upper stack members the central portion or hub of each member formed by the depression is provided with a central aperture 15 through which at least a second media can be introduced into an underlying plate member. A fluid communication, as shown, is provided between a central aperture at zone 16 and the angularly displaced aperture of an underlying plate member for mixing the first and second media; thereunder (in case a third media is to be added to the reaction mixture) are provided a number of the circular members each containing the two apertures. However, the aperture 15b of these plate members is smaller than aperture 15 so as to reduce the flow down the center of the plate members. A second fluid communication is provided at zone 17 between the apertures 15b and an underlying angularly displaced aperture for mixing the three media. The lowermost plate members preferably contain no central aperture as in members 1 and 1a of FIG. 1. Lines 5 and 8 are preferably replaced by concentric or eccentric tubes such that the outer tube extends only to zone 16 and supplies a media which mixes with the media from line 4, and the inner tube extends to zone 17 and the media therein mixes with the mixture passing down the reactor from zone 16.

When a tower of this design is used in the oxidative dehydrogenation processes, as in the case of the tower of FIG. 1, the feed lines 5 and 8 should be made of noncorrosive materials especially siliceous material such as glass or silicon carbide. The plate members should be made of siliceous materials preferably silicon carbide, and the quench chamber 11, nozzle 13 and line 14 should be made of titanium, zirconium or titanium-palladium alloy. In the tower of FIG. 2 the organic feed such as methyl isobutyrate passes into the tower through line 4, meeting the hydrogen iodide hydrate catalyst from line 5 at zone 16, at temperatures of about 350° C., and mixes with air from line 8 at zone 17. The reaction in the lower part of the reactor is carried out at the higher temperature of about 650° C. By the use of the plate members described the reaction mixture travels in an arcuate path down through the reactor at relatively high linear velocity.

FIG. 3 shows a view of a circular plate member from the side having a sector of annular depression 18 forming a radial tenon 19, hub 19a and a rim with a circular lip 20, and FIG. 4 is a view from the opposite side of the plate showing the sector of an annular extension 21 forming a peripheral shoulder 22 and a radial mortise 23, the latter being angularly displaced from the tenon, for example by about 70°, and an aperture 24 arranged between one end of the depression and the other corresponding end of the extension, the mortise and tenon cooperating with mating parts on adjacent members when in stack relation for interlocking the members and for angularly displacing the aperture relative to the aperture in an adjacent member as shown in either of FIGURE 3 or FIGURE 4. Accordingly, one or more media introduced into the depression in any one of the members flows in an arcuate path from the aperture in that member to the aperture in an adjacent lower member. The entire length of the tower may contain these plates. However, when it is desired to mix the media traveling in the arcuate path with another media at a lower level of the tower, the plates in the upper portion of the tower are provided with a central aperture as shown in FIG. 2.

It will be seen by consideration of FIG. 3 that the plate members may be particularly described as comprising a circular plate having a radially displaced aperture and an annular peripheral rim 20 extending from one surface of said plate; a central cylindrical hub portion extending from said one surface and having its outer face coplanar with the face of the rim; a radial divider 19 at one side of the aperture and extending from the one surface between the hub portion and the rim; and from the view shown in FIG. 4; an annular extension 21 on the surface of the plate having a radial recess 23 arranged at the other side of said aperture; the inner diameter of the extension being greater than that of said hub portion, the outer diameter of the extension being less than the inner diameter of the rim, and the width of the radial recess 23 in the extension being greater than the width of said radial divider 19. Thus the plates stacked in the reactor interlock providing an arcuate flow of fluid down through the reactor away from the walls of the reactor thereby providing greater linear velocity and longer contact time in the reactor than would be the case with other reactors containing random packing. This results in the prevention of carbonization in the reactor and much better yields are obtained. By providing a central aperture and communication means described above for mixing reactants in the interior of the reactor away from the hot walls, a variety of reactions can be carried out in different temperature zones of the reactor accompanied by little carbonization and good heat transfer.

The invention has been described in considerable detail with particular reference to certain preferred embodiments thereof, but it will be understood that variations and modifications can be effected within the spirit and scope of the invention as described hereinabove, and as defined in the appended claims.

What we claim is:
1. A reaction tower comprising in combination:
   a cylindrical shell;
   a plurality of circular members positionable in a stacked relation within said shell;
   means for introducing at least one reactant; and
   means for withdrawing reaction effluent;
   each of said members having on one side a hub and rim connected by a radial divider to form a sector of an annular depression therein;
   on the opposite side a radial recess angularly displaced with respect to said divider; and
   a fluid passageway linking both sides and positioned between said angularly displaced radial divider and radial recess;
   said radial divider and radial recess being adapted to mate with a radial recess and radial divider, respectively, on adjacently positioned members;
   whereby, when in said stacked relation, the fluid passageway in one member is angularly displaced in relation to the fluid passageway in a next adjacent member such that a media introduced into the depression in any one of said members is caused to flow in an arcuate path between adjacent members.

2. A reaction tower in accordance with claim 1 wherein at least one of said circular members is provided with passageway through said hub, said passageway linking both sides of said circular members.

3. A reaction tower comprising in combination:
   a cylindrical shell;
   a plurality of circular members positionable in a stacked relation within said shell;
   means for introducing at least one reactant; and
   means for withdrawing reaction effluent;
   each of said members having a first and second surface and a fluid passageway connecting said surfaces;
   said first surface having formed therein a sector of an annular depression, said depression forming a radial tenon and a rim with a circular lip;
   said second surface having formed therein a peripheral shoulder and a radial mortise, said shoulder and mortise forming a sector of an annular extension;
   said mortise being angularly displaced with respect to said tenon;
   said fluid passageway being positioned between said tenon and said mortise; and
   means for interlocking said member with adjacently positioned members; whereby when in said stacked relation, said members are interlocked and the fluid passageway in one member is angularly displaced in relation to the fluid passageway in a next adjacent member such that a media introduced into the depression in any one of said members is caused to flow in an arcuate path between adjacent members.

4. A member positionable within the shell of a reactor for providing an arcuate flow path for a media introduced into said tower, comprising at least two plates, said plates being interlocked;
   each of said plates having a first and second surface and a fluid passageway connecting said surfaces;
   each of said first surfaces having a peripheral wall, a centrally disposed hub and a radial divider extending between said wall and said hub;
   each of said second surfaces having a centrally disposed depression and a peripheral shoulder, said depression and shoulder forming an annular extension, said extension having formed therein a radial recess;
   said radial recess being angularly displaced with respect to said divider;
   said fluid passageway being positioned between said divider and said recess;
   each of said plates having means for interlocking one with another;
   whereby a closed arcuate path having angularly displaced passageways is formed.

5. A reaction tower in accordance with claim 1 having at the lower end of the tower a chamber adapted to quenching hot effluent from the reactor with chilled media to rapidly reduce the temperature of the effluent and means for introducing the chilled media into the chamber.

6. A reaction tower in accordance with claim 5, the walls of the chamber subject to the hot effluent being made of a material selected from the class consisting of titanium, zirconium or titanium-palladium alloy.

7. A reaction tower in accordance with claim 1 wherein, in at least one of the uppermost stacked members, the hub of said member is provided with at least one central aperture through which is at least one other media can be introduced into a lower member, and fluid communication between the lower-most central aperture and said first-mentioned aperture for mixing said media.

8. A reaction tower in accordance with claim 1 wherein, in at least one of the uppermost stacked members, the hub of said member is provided with at least one central aperture through which a second and third media can be separately introduced into a lower member of a first and second lower zone, each of said lower zones comprising at least one of said members, means for introducing said second media into said first lower zone, fluid communication between the lower-most central aperture of said first lower zone and the angularly displaced aperture of an underlying member for mixing the first and second media, means for introducing said third media into said second lower zone, fluid communication between the lower-most central aperture of said second lower zone and the angularly displaced aperture of an underlying plate member for mixing the three media, and thereunder a number of said stacked members having at least said angularly displaced aperture.

9. A reaction tower in accordance with claim 1 wherein the stacked members are made up of silicon carbide.

References Cited

UNITED STATES PATENTS 2,693,391   11/1954   Manseau _____ 259—4

JAMES H. TAYMAN, JR., Primary Examiner

U.S. Cl. X.R.

23—208, 252; 259—4; 260—465.9; 261—94, 113